(12) United States Patent
Gretz

(10) Patent No.: US 7,897,870 B1
(45) Date of Patent: Mar. 1, 2011

(54) CABLE ROUTING ASSEMBLY INCLUDING LOW VOLTAGE BRACKET AND SCOOP

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 217 days.

(21) Appl. No.: 12/384,423

(22) Filed: Apr. 3, 2009

Related U.S. Application Data

(63) Continuation-in-part of application No. 12/290,374, filed on Oct. 30, 2008, now Pat. No. 7,847,190, which is a continuation-in-part of application No. 12/082, 030, filed on Apr. 8, 2008, now Pat. No. 7,820,911, which is a continuation-in-part of application No. 12/075,326, filed on Mar. 11, 2008, now Pat. No. 7,834,267, and a continuation-in-part of application No. 12/012,907, filed on Feb. 6, 2008, now Pat. No. 7,759,576, and a continuation-in-part of application No. 12/011,162, filed on Jan. 24, 2008, now Pat. No. 7,563,979.

(51) Int. Cl.
*H01H 9/02* (2006.01)

(52) U.S. Cl. .............................. 174/58; 174/57; 174/60; 174/61; 174/135; 248/343

(58) Field of Classification Search .................. 174/53, 174/58, 63, 64, 66, 67, 60, 61, 135, 665, 174/668; 220/241, 242; 439/131, 135, 144; D8/350–353; 248/300, 343
See application file for complete search history.

(56) References Cited

U.S. PATENT DOCUMENTS

| | | | |
|---|---|---|---|
| 4,343,411 A * | 8/1982 | Chesnut et al. | 220/242 |
| 4,688,747 A | 8/1987 | Helmsdorfer et al. | |
| 5,049,086 A * | 9/1991 | Slaven | 439/143 |
| 6,064,003 A | 5/2000 | Moore et al. | |
| 6,102,360 A | 8/2000 | Clegg et al. | |
| 6,793,524 B2 | 9/2004 | Clark et al. | |
| D503,156 S | 3/2005 | Provenzano | |
| 7,390,964 B2 | 6/2008 | Gorin et al. | |
| 7,399,920 B2 * | 7/2008 | Gorin et al. | 174/66 |
| 7,528,322 B1 * | 5/2009 | Gretz | 174/57 |
| 7,667,136 B2 * | 2/2010 | Dinh et al. | 174/58 |
| 7,667,137 B1 * | 2/2010 | Beckman | 174/58 |
| 2008/0110886 A1 | 5/2008 | Provenzano et al. | |

* cited by examiner

*Primary Examiner*—Dhiru R Patel

(57) ABSTRACT

A cable routing assembly for rapidly providing a portal for routing cables through a wall. The assembly includes a low voltage bracket and a scoop member. Rotatable flags are provided on the low voltage bracket to enable rapid mounting to the wall. The scoop member includes a cover plate and a shield with a cable opening therein projecting from one side of the cover plate. A fastening arrangement is provided to enable rapid securing of the scoop to the low voltage bracket and the wall. The assembly provides several mounting options for providing an attractive cable portal in a wall. The cover plate can be mounted to the low voltage bracket with the shield projecting outward from the wall or inward through the low voltage bracket and can be rotated to position the cable opening upward or downward.

20 Claims, 10 Drawing Sheets

US 7,897,870 B1

CABLE ROUTING ASSEMBLY INCLUDING LOW VOLTAGE BRACKET AND SCOOP

This application is a Continuation-In-Part of U.S. patent application Ser. No. 12/290,374 filed Oct. 30, 2008 now U.S. Pat. No. 7,847,190, which is a Continuation-In-Part of U.S. patent application Ser. No. 12/082,030 filed Apr. 8, 2008 now U.S. Pat. No. 7,820,911, which is a Continuation-In-Part of U.S. patent application Ser. No. 12/075,326 filed Mar. 11, 2008 now U.S. Pat. No. 7,834,267, and is a Continuation-In-Part of U.S. patent application Ser. No. 12/012,907 filed Feb. 6, 2008 now U.S. Pat. No. 7,759,576, and is a Continuation-In-Part of U.S. patent application Ser. No. 12/011,162 filed Jan. 24, 2008 now U.S. Pat. No. 7,563,979, all of which are commonly owned by the assignee of the present invention and the entire contents of which are incorporated herein by reference.

FIELD OF THE INVENTION

This invention relates to the installation of low voltage wiring in buildings and specifically to a combination of a low voltage bracket and a protective cable chute for routing low voltage electrical or communications cables through interior walls.

BACKGROUND OF THE INVENTION

A wide variety of low voltage components such as telephone cables, coax cables for television and interne service, wiring for home entertainment systems and surround sound, and cables for connecting computers to peripherals such as printers and facsimile machines, are prevalent in today's homes and offices. Frequently it is necessary to route these low voltage wires and cables through interior walls in order to connect low voltage components in separate rooms.

U.S. patent application Ser. Nos. 12/290,374, 12/082,030, 12/075,326, and 12/011,162, all of which share common ownership and inventorship with the present application, disclosed various cable chutes or scoops for routing low voltage wires and cables through walls. The cable chutes disclosed in these patent applications were generally for use in conjunction with a conventional electrical box.

The current disclosure provides an improved cable chute or scoop for routing low voltage wires and cables through walls. The scoop and low voltage bracket of the present invention significantly simplifies the task of installing a cable chute or portal to a wall and thus provides significant reduction in installation time. In comparison with prior art devices for routing cables through walls, the amount of time required for preparing the wall for installation and the time required to install the scoop are significantly reduced. Thus the scoop and bracket combination of the present invention provide significant time savings over prior art cable routing devices.

SUMMARY OF THE INVENTION

The invention is a cable routing assembly for rapidly providing a portal for routing low voltage wires and cables through walls. The assembly includes a low voltage bracket and a scoop. Prepping a wall for installation of the low voltage bracket requires only a standard size hole saw for creating a round hole. Rotatable flags are provided on the low voltage bracket to enable rapid mounting to the wall. The scoop includes a cover plate and a shield with a cable opening therein projecting from one side of the cover plate. A fastening arrangement is provided to enable rapid securing of the scoop to the low voltage bracket and the wall. The assembly provides several mounting options for providing an attractive cable portal in a wall. The cover plate can be mounted to the low voltage bracket with the shield projecting outward from the wall or inward through the low voltage bracket and can be rotated to position the cable opening upward or downward.

OBJECTS AND ADVANTAGES

Several advantages are achieved with the cable routing assembly of the present invention, including:
  (1) The cable routing assembly enables easy installation of a cable portal in a wall with minimal wall preparation.
  (2) Wall preparation requires only a round hole which can be provided rapidly by a standard size hole saw.
  (3) The cable routing assembly eliminates the need for an electrical box for providing a cable portal in a wall.
  (4) The cable routing assembly enables routing low voltage wires and cables through walls with a minimum of time and effort.
  (5) The cable routing assembly includes a cover plate that is reversible and rotatable with respect to the bracket, thereby providing several options for providing an attractive and utilitarian cable portal in a wall.
  (6) Mounting the cover plate with the cable shield extending inward enables placement of low voltage components in close proximity of the wall-mounted cable chute.
  (7) Major portions of the cover plate and bracket can be molded of plastic to reduce production cost.

These and other objects and advantages of the present invention will be better understood by reading the following description along with reference to the drawings.

Figure 1:
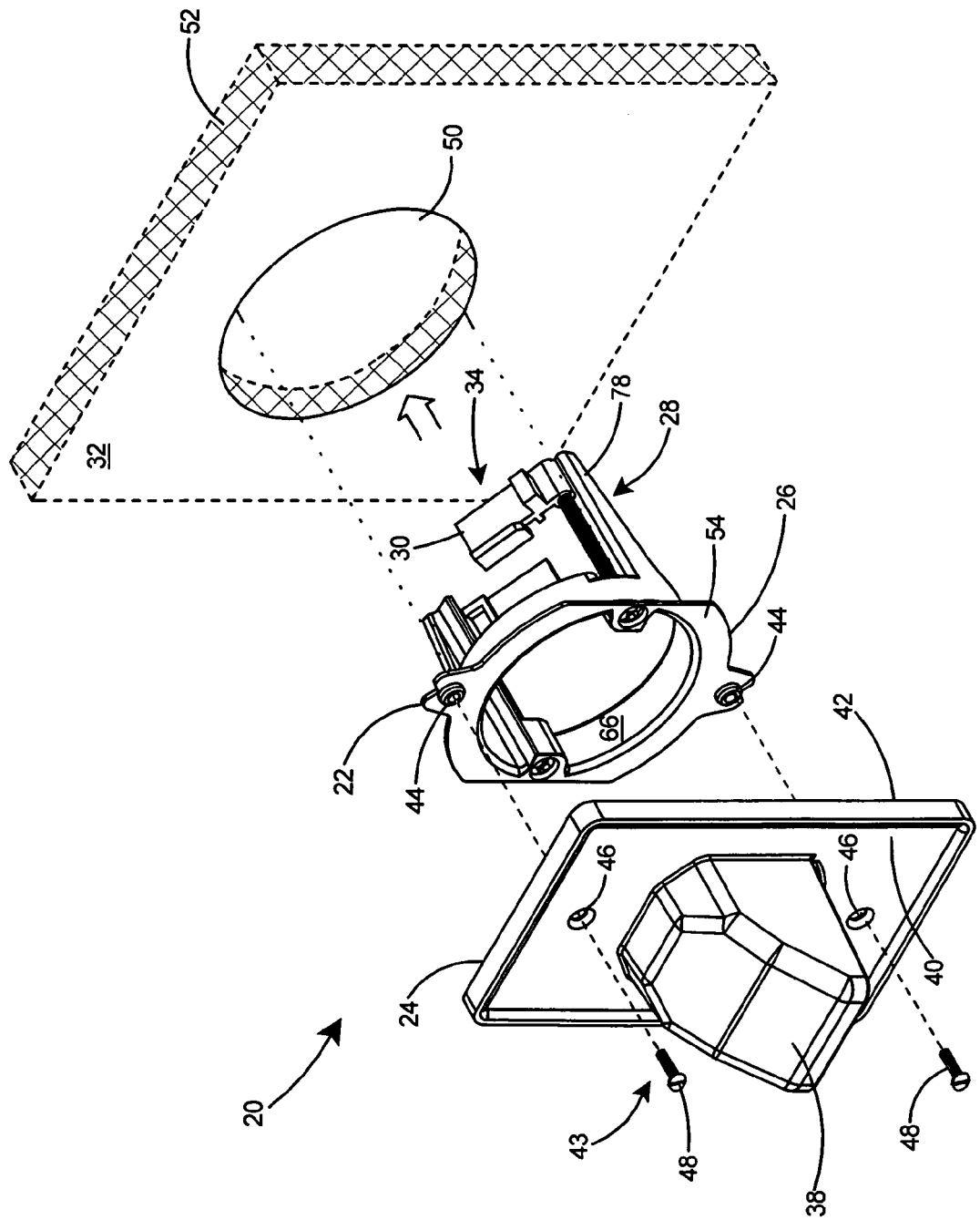
FIG. 1 is a perspective view of a preferred embodiment of a cable routing assembly according to the present invention.

| INDEX TO REFERENCE NUMERALS IN DRAWINGS | |
|---|---|
| 20 | reversible cable routing assembly |
| 22 | low voltage bracket |
| 24 | cover plate or scoop member |
| 26 | frame member |
| 28 | mounting arrangement |
| 30 | rotatable flag |
| 32 | wall |
| 34 | retracted orientation of rotatable flag |
| 36 | extended orientation of rotatable flag |
| 38 | cable shield |
| 40 | first side of plate |
| 42 | second side of plate |
| 43 | fastening arrangement |
| 44 | boss in frame member |
| 46 | two-way aperture |
| 48 | fastener |
| 50 | circular hole |
| 52 | sheetrock |
| 54 | face flange |
| 56 | outer periphery of face flange |
| 58 | inner periphery of face flange |
| 60 | opening in face flange |
| 62 | arcuate shaped portion of face flange |
| 64 | truncated side of face flange |
| 66 | collar of frame member |
| 68 | mounting fastener |
| 70 | distal end of mounting fastener |
| 72 | tab |
| 74 | first side of face flange |
| 76 | second side of face flange |
| 78 | leg |
| 80 | planar main portion of leg |
| 82 | brace portion of leg |
| 84 | outer surface of brace portion |
| 86 | outer surface of collar |
| 88 | inner periphery of collar |
| 90 | flat front face of flag |
| 92 | proximal end of flag |
| 94 | distal end of flag |
| 96 | bore in flag |
| 98 | outer edge of cover plate |
| 100 | raised periphery of cover plate |
| 102 | opening in cover plate |
| 104 | recessed area |
| 106 | vertical axis through cover plate |
| 108 | countersunk area |
| 110 | cable opening |
| 112 | planar horizontal portion of cable shield |
| 114 | outer wall portion of cable shield |
| 116 | vertical lip of cable shield |
| 118 | first orientation of cable routing assembly |
| 120 | fourth orientation of cable routing assembly |
| 122 | slot |
| D1 | depth of recessed area of cover plate |
| T1 | thickness of face flange |

DETAILED DESCRIPTION OF THE INVENTION

Figure 2:
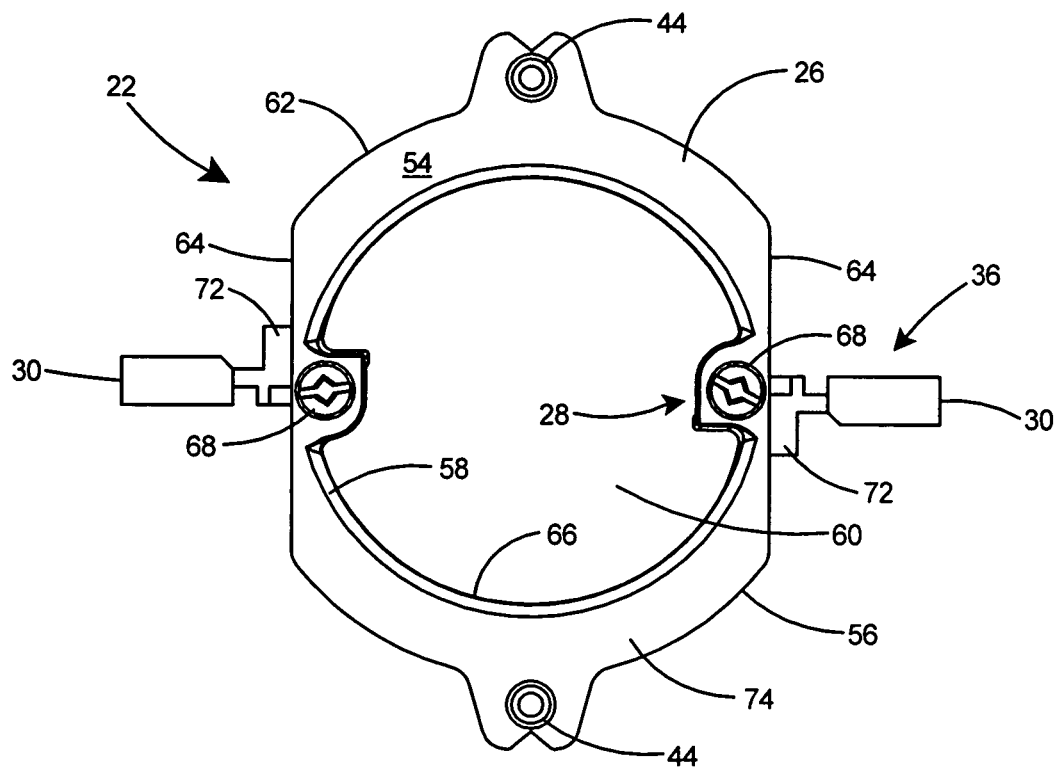
FIG. 2 is a front view of a low voltage bracket that forms a portion of the cable routing assembly of FIG. 1.

Referring to FIG. 1 there is shown a preferred embodiment of the present invention, a cable routing assembly 20. The cable routing assembly 20 includes a low voltage bracket 22 and a cover plate 24. The low voltage bracket 22 includes a frame member 26 and a mounting arrangement 28 with rotatable flags 30 for securing the low voltage bracket 22 to a wall 32. The rotatable flags 30 are capable of being rotated from a retracted orientation 34, as shown in FIG. 1 to an extended orientation 36 as shown in FIG. 2. The cover plate 24 includes a first side 40 and a second side 42 and an outward extending cable shield 38 extending from a first side 40 of the cover plate 24 as shown. A fastening arrangement 43 for fastening the cover plate 24 to the low voltage mounting bracket 22 includes bosses 44 in the frame member 26 of the low voltage bracket 22, two-way apertures 46 in the cover plate 24, and a fastener 48 for securing through the cover plate 24 into the bosses 44 in the low voltage bracket 22. As shown in FIG. 1, very little preparation work is required with the cable routing assembly 20 of the present invention in order to provide a cable portal on a wall 32. Installation is very straightforward, simple, and requires minimal installation time as the installer only needs to create a circular hole 50 in the wall 32 to accommodate the assembly 20. A circular hole can be created easily in the sheetrock 52 or equivalent wall covering by using a standard size hole saw in a drill or similar tool. The cable routing assembly 20 can then be rapidly installed on the wall 32 by simply rotating the rotatable flags 30 inward, inserting the low voltage bracket 22 into the hole 50, rotating the flags 30 outward and tightening them until they are drawn tightly against the wall 32, and then securing the cover plate 24 to the low voltage bracket 22 and the wall 32 with the fastening arrangement 43.

Figure 3:
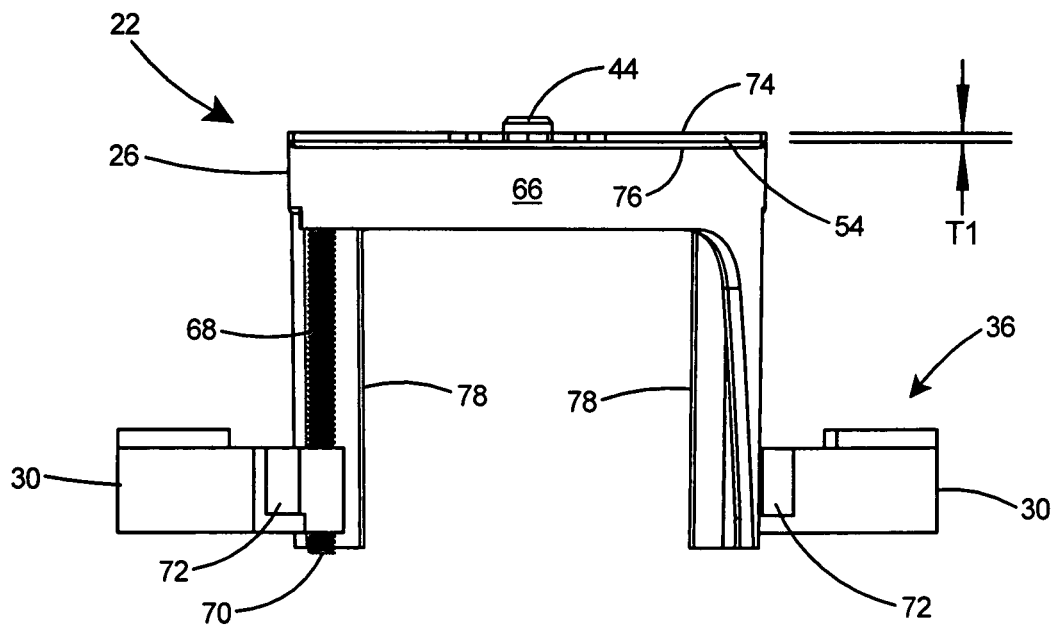
FIG. 3 is a side view of the low voltage bracket of FIG. 2.

With reference to FIGS. 2 and 3, the frame member 26 of the low voltage bracket 22 includes a face flange 54 having an outer periphery 56, a substantially circular inner periphery 58, and an opening 60 therein. The outer periphery 56 of the face flange 54 includes arcuate shaped portions 62 on the top and bottom and truncated sides 64. A collar 66 extends rearward from the inner periphery 58 of the face flange 54. The mounting arrangement 28 includes two mounting fasteners 68 extending through the face flange 54 of frame member 26. Each of the mounting fasteners 68 includes a distal end 70 with a rotatable flag 30 thereon and a tab 72 extending from the rotatable flag 30. The face flange 54 includes a first side 74 and a second side 76 and a leg 78 located adjacent each of the tabs 72. Each of the legs 78 extend rearward from the second side 76 of the face flange 54. Tightening of the mounting fasteners 68 enables each of the tabs 72 to engage a corresponding leg 78, thereby stopping rotation of the rotatable flags 30 and enabling additional tightening of the mounting fasteners 68 to draw each of the rotatable flags 30 toward the frame member 26.

Figure 4:
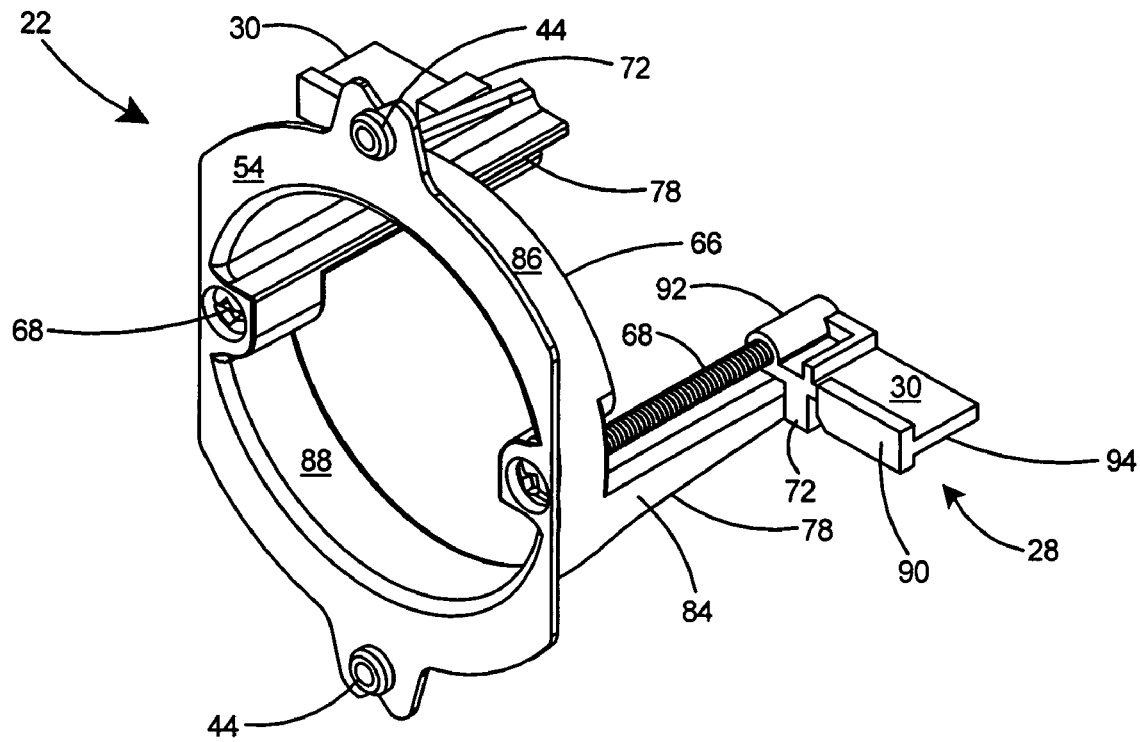
FIG. 4 is a front perspective view of the low voltage bracket of FIG. 2.
Figure 5:
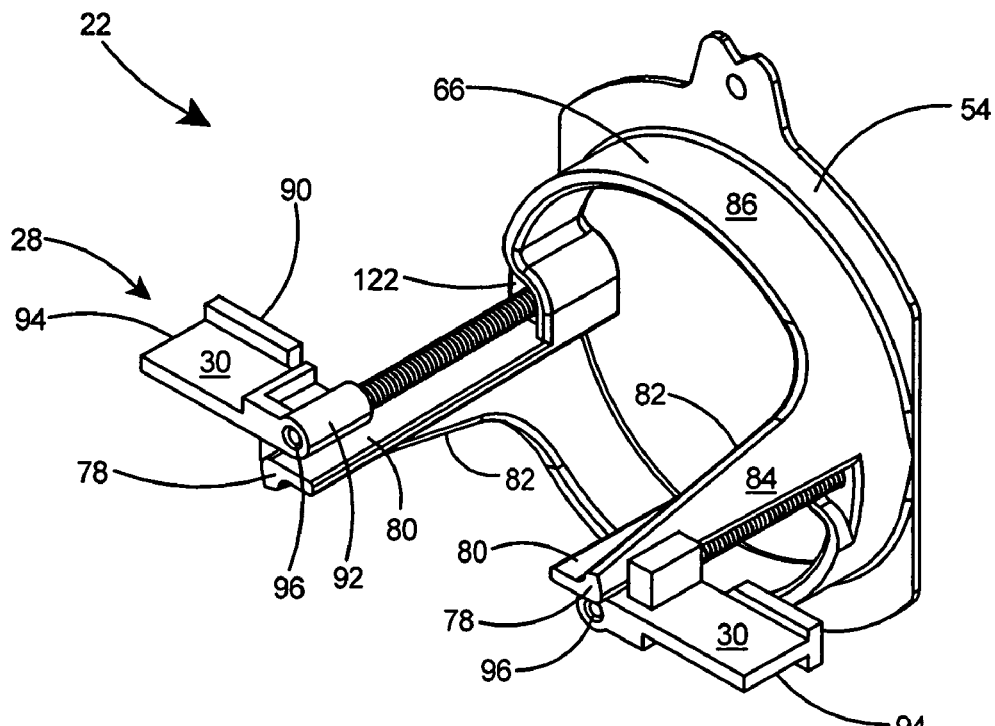
FIG. 5 is a rear perspective view of the low voltage bracket of FIG. 2.

Referring to FIGS. 4 and 5, each of the legs 78 are substantially L-shaped in cross-section and include a substantially planar main leg portion 80 and a brace portion 82 with an outer surface 84. The collar 66 includes an outer surface 86 and the outer surface 84 of the brace portion 82 of the leg 78 is flush with the outer surface 86 of the collar 66. Thus the outer surface 84 of the leg 78 does not extend beyond the outer surface 86 of the collar 66. Therefore, with the rotatable flags 30 rotated to the retracted orientation 34 (see FIG. 1); the collar 66 and legs 78 are capable of easily slipping into the circular hole 50 in the wall 32. As shown in FIG. 4, the collar 66 includes an inner periphery 88 and the mounting fasteners 68 of the mounting arrangement 28 are inward of the inner periphery 88 of the collar 66 thereby ensuring that the mounting fasteners 68 do not interfere with inserting the low voltage bracket 22 into the hole 50 in the wall 32 (see FIG. 1). As shown in FIGS. 4 and 5, rotatable flags 30 include a flat front face 90, a proximal end 92, a distal end 94, and a bore 96 within the proximal end 92.

Figure 6:
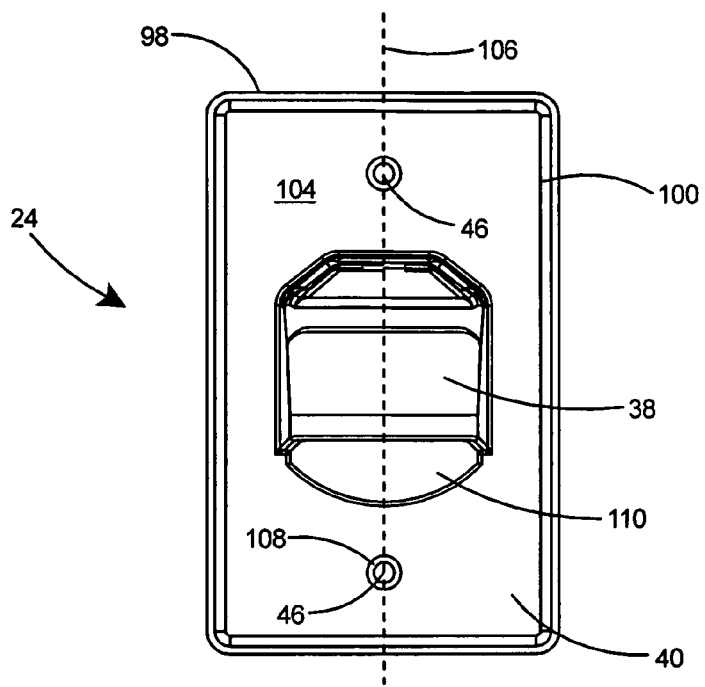
FIG. 6 is a front view of a cover plate that forms a portion of the cable routing assembly of FIG. 1.
Figure 7:
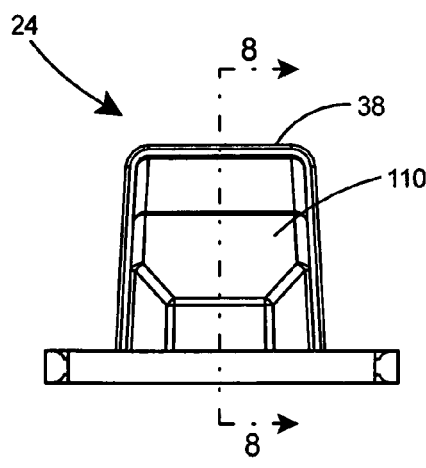
FIG. 7 is a bottom view of the cover plate of FIG. 6.
Figure 8:
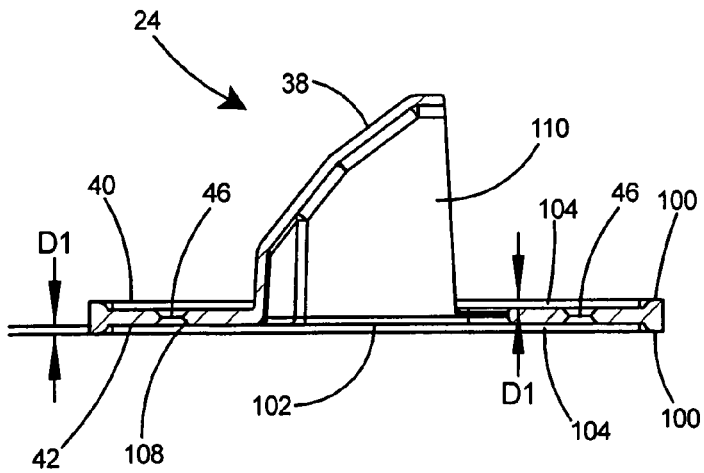
FIG. 8 is a sectional view of the cover plate taken along line 8-8 of FIG. 7.
Figure 9:
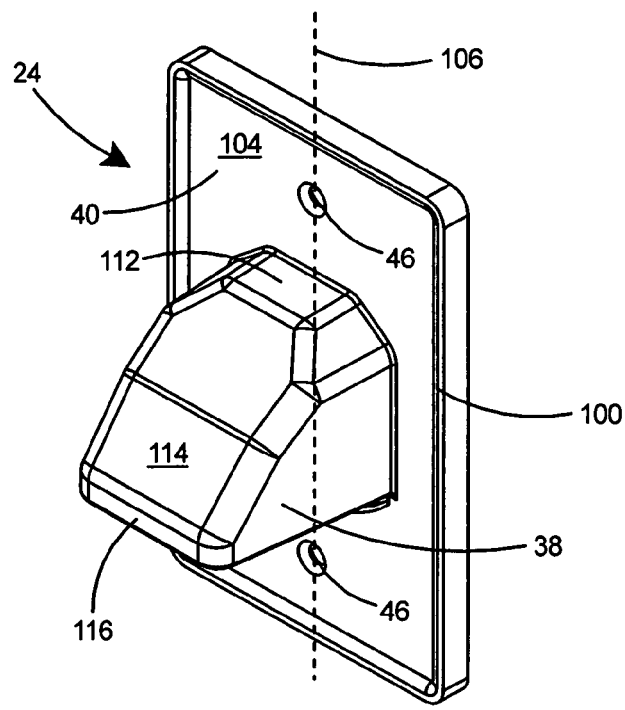
FIG. 9 is a front perspective view of the cover plate portion of the cable routing assembly.
Figure 10:
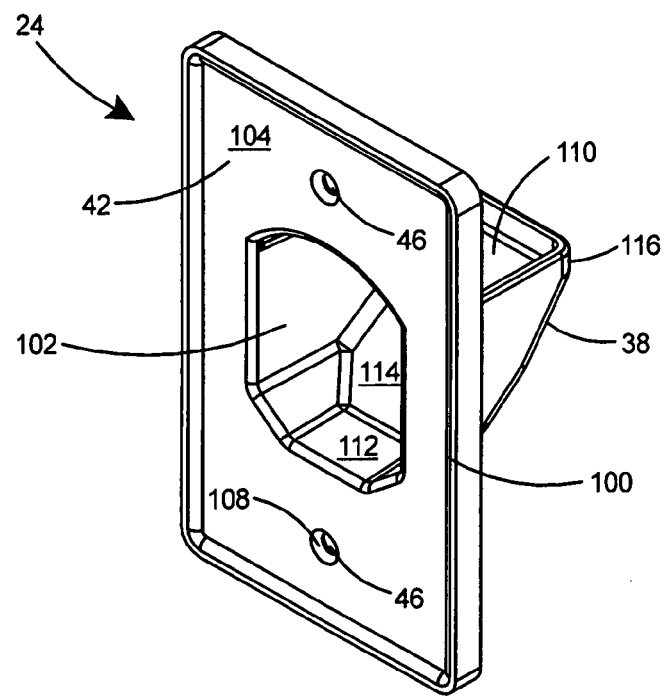
FIG. 10 is a rear perspective view of the cover plate portion of the cable routing assembly.

With reference to FIGS. 6-8, the cover plate 24 includes an outer edge 98, a raised periphery 100 around the outer edge 98 and an opening 102 (see FIG. 8) therein. The raised periphery 100 extends from both the first side 40 and second side 42 of the cover plate 24 and thereby creates a recessed area 104 on each side 40, 42 of the cover plate 24. As shown in FIGS. 9 and 10, the recessed area 104 on the first side 40 of the cover plate 24 extends between the outward extending cable shield 38 and the raised periphery 100. The recessed area 104 on the second side 42 of the cover plate 24 extends between the opening 102 and the raised periphery 100 of the cover plate 24. The recessed area 104 is most preferably recessed a depth D1 (see FIG. 8) of at least 0.065 inch from the raised periphery 100 of the cover plate 24. The depth D1 of the recessed areas 104 on each side of the cover plate 24 will enable either side 40, 42 of the cover plate 24 to accommodate the entire thickness T1 (see FIG. 3) of the face flange 54 when the cable routing assembly is installed on a wall and will also enable the raised periphery 100 portion of the cover plate 24 to fit flush against a wall. The two-way apertures 46, which are aligned along a vertical axis 106 through the cover plate 24, are of a spacing and pattern to match and align with the bosses 44 on the low voltage bracket 22 (see FIG. 1). As shown in FIG. 8, the two-way apertures 46 include countersunk areas 108 in the first side 40 and in the second side 42 of the cover plate 24. The cable shield 38 further includes a cable opening 110 as shown in FIGS. 6-8 that leads to opening 102 in plate 24.

As shown in FIGS. 9 and 10, the outward extending cable shield 38 includes a planar horizontal portion 112 extending from the first side 40 of the cover plate 24 and an outer wall portion 114. The outward extending cable shield 38 further includes a vertical lip 116 extending downward from the outer wall 114 portion.

Figure 12:
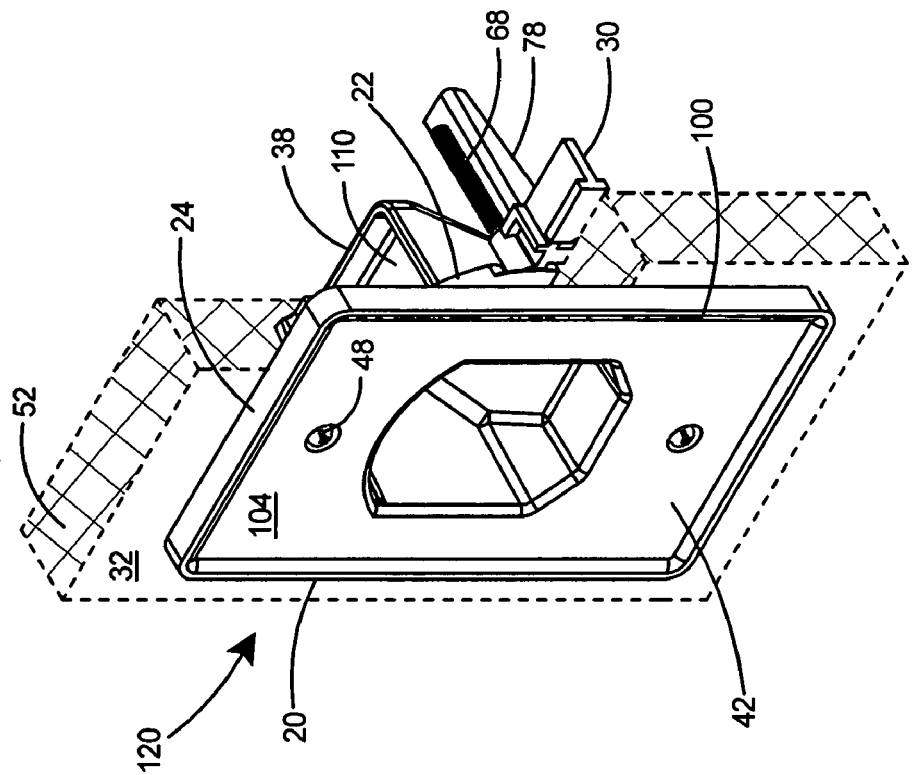
FIG. 12 is a perspective view of the cable routing assembly of the present invention installed on a wall with the cable shield oriented inward with respect to the wall and the cable opening oriented upward.
Figure 11:
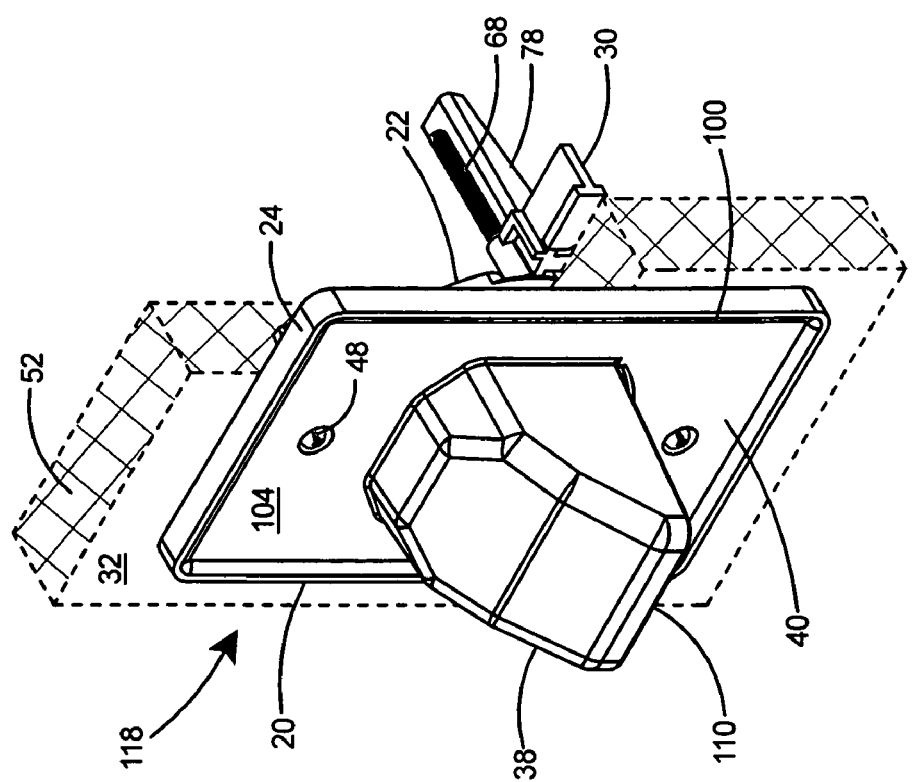
FIG. 11 is a perspective view of the cable routing assembly of the present invention installed on a wall with the cable shield oriented outward with respect to the wall and the cable opening oriented downward.

With reference to FIGS. 11 and 12, the cable routing assembly 20 of the present invention can be secured to a wall in several different configurations, based on the desires of the homeowner. The cover plate 24 can be oriented in four separate orientations with respect to the low voltage bracket 22 including a first orientation 118 (see FIG. 11) with the cable shield 38 extending outward from the low voltage bracket 22 and the cable opening 110 facing downward. A second orientation (not shown) would include the cable shield 38 extending outward from the low voltage bracket 22 and the cable opening 110 facing upward. A third orientation (not shown) would include the cable shield 38 extending inward from the low voltage bracket 22 and the cable opening 110 facing downward. A fourth orientation 120 (see FIG. 12) would include the cable shield 38 extending inward from the low voltage bracket 22 and inward of the wall 32 and the cable opening 110 facing upward. The plurality of potential orientations of the cover plate 24 with respect to the low voltage bracket 22 provides several options for creating an attractive cable portal on a wall. An orientation 118 such as shown in FIG. 11, for example, would be appropriate for creating a cable portal on a low portion of the wall, as the cable shield 38 would mask the view of the installed cables from the viewer.

Preferably, the cover plate 24 and the frame member 26 are each molded in one piece of plastic. The preferred plastic material of construction may include polycarbonate, polyvinyl chloride, acrylonitrile-butadiene styrene, or polyethylene.

Figure 13:
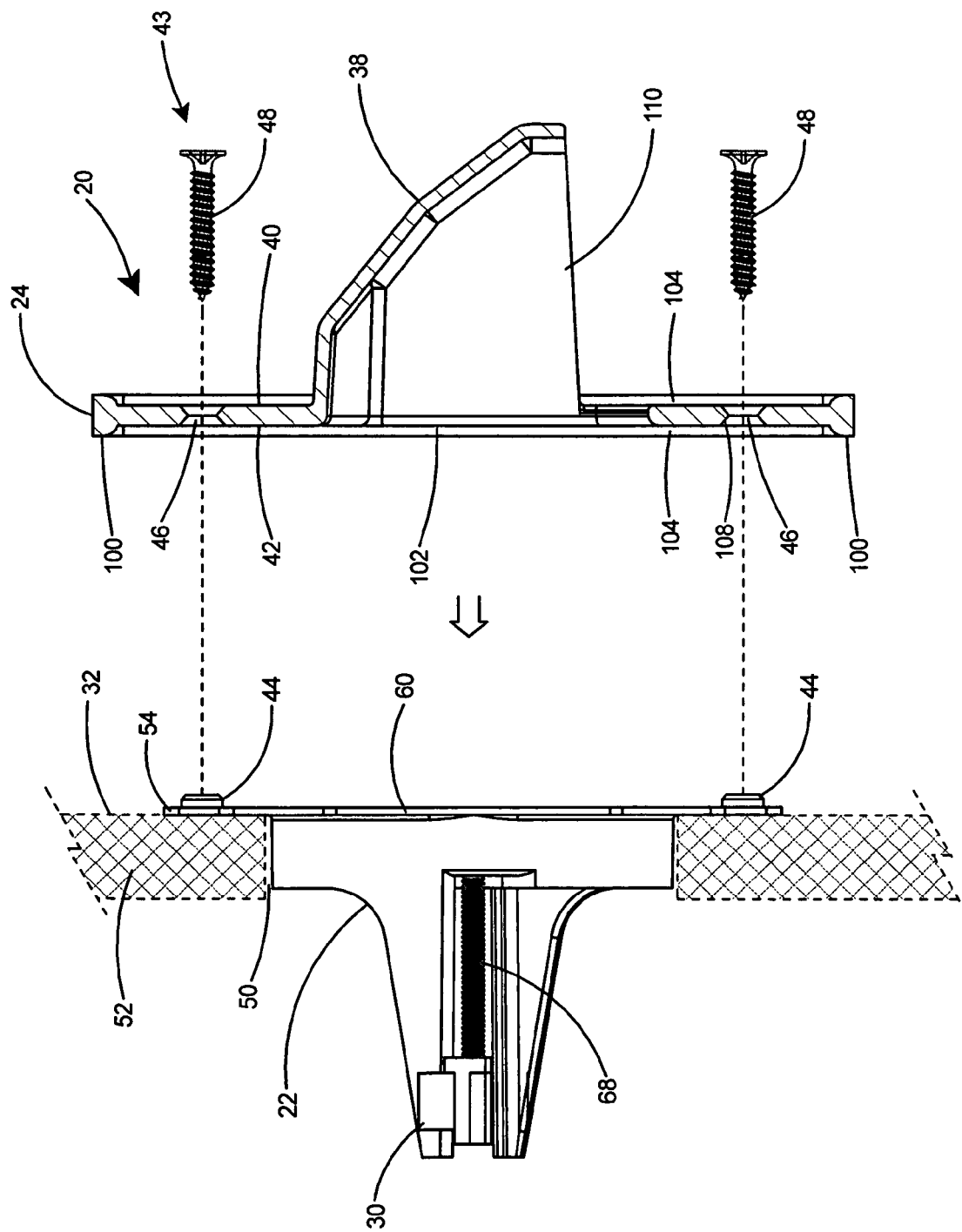
FIG. 13 is a side view depicting the low voltage bracket placed in a hole in a wall and the cover plate in alignment with the low voltage bracket to be secured thereto.

For operation of the cable routing assembly of the present invention, reference is made to FIG. 13 where there is shown a side view depicting the low voltage bracket 22 placed in a hole 50 in a wall 32 and the cover plate 24 in alignment with the low voltage bracket 22 ready to be secured thereto. Heretofore, cable portals for walls were used in conjunction with an electrical box (not shown). Therefore, in order to provide a cable portal an installer typically had to first install an electrical box in the wall, which required a great deal of preparation time as a hole had to be prepared for the electrical box and the box secured to a stud or similar structural support. The cable routing assembly 20 of the present invention however vastly reduces the installation time as there is no need to install an electrical box. The wall 32 is simply prepped by cutting a circular hole 50 in the sheetrock 52 using a conventional hole saw (not shown), typically a 2.5-inch diameter hole saw. With the rotatable flags 30 rotated inwards to the retracted orientation, the low voltage bracket 22 is inserted through the circular hole until face flange 54 is flush against the wall surface. The mounting fasteners 68 are then tightened until rotatable flags 30 are drawn tightly against the wall 32 (see FIG. 14). As shown in FIG. 13, fasteners 48 of fastening arrangement 43 are then tightened into the bosses 44 extending from the face flange 54 to secure the cover plate 24 to the low voltage bracket 22 and the wall 32. As stated hereinabove, the cover plate 24 can be oriented with the cable shield 38 oriented outwards as shown in FIG. 13 and with the cable opening 110 facing downward or in three alternative orientations as may be selected by the homeowner. The cover plate 24 in FIG. 13 can also be rotated 180° and secured to the low voltage bracket 22 with the cable opening 110 oriented upward. If the homeowner so desires, the cover plate 24 in FIG. 13 can also be turned around 180° and secured to the low voltage bracket 22 with the cable shield 38 projecting through the opening 60 in the face flange 54. Two orientations (not shown) are available with the cable shield 38 projecting into the wall 32, including one orientation with the cable opening 110 oriented upward and a separate orientation with the cable opening oriented downward. The two-way apertures 46 enable easy attachment of the cover plate 24 to the low voltage bracket 22 with conventional flat head or oval head countersunk screws. The two-way apertures 46 with countersunk areas 108 on both sides 40 and 42 of the cover plate 24 enable the cover plate 24 to be secured to the low voltage bracket 22 with either the cable shield 38 facing either toward or away from the wall 32.

Figure 14:
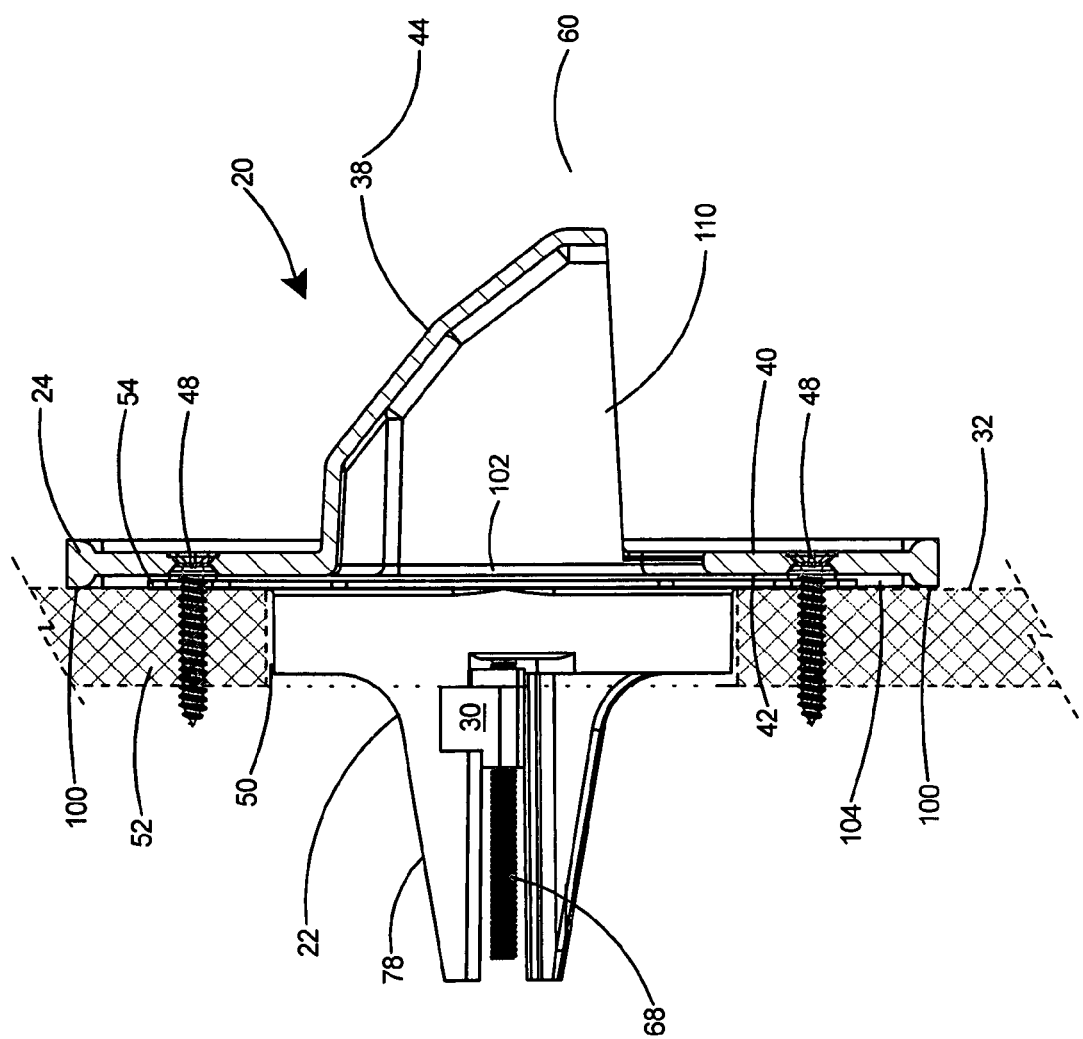
FIG. 14 is a side view of the cable routing assembly of FIG. 13 after the cover plate portion has been secured to the low voltage bracket.

FIG. 14 depicts the cable routing assembly 20 of FIG. 14 after the low voltage bracket 22 has been secured to the wall 32 by the rotatable flags 30 and the cover plate 24 has been secured to the low voltage bracket 22. Considerably less time is required to install a cable portal in a wall with the cable routing assembly 20 of the present invention as compared to prior art cable shields which were used in conjunction with an electrical box. The cable routing assembly 20 of the present invention frees the installer of the task of installing an electrical box, which typically requires that a rectangular opening be cut in the wall and the electrical box be securely mounted to a stud or similar support structure before attaching a cable shield to the box. As shown in FIG. 14, regardless of which side 40, 42 is oriented toward the wall 32, the recessed area 104 is deep enough to accommodate the entire thickness of the face flange 54 and thereby enable the cover plate 24 at raised periphery 100 to seat flush against the wall 32.

Figure 15:
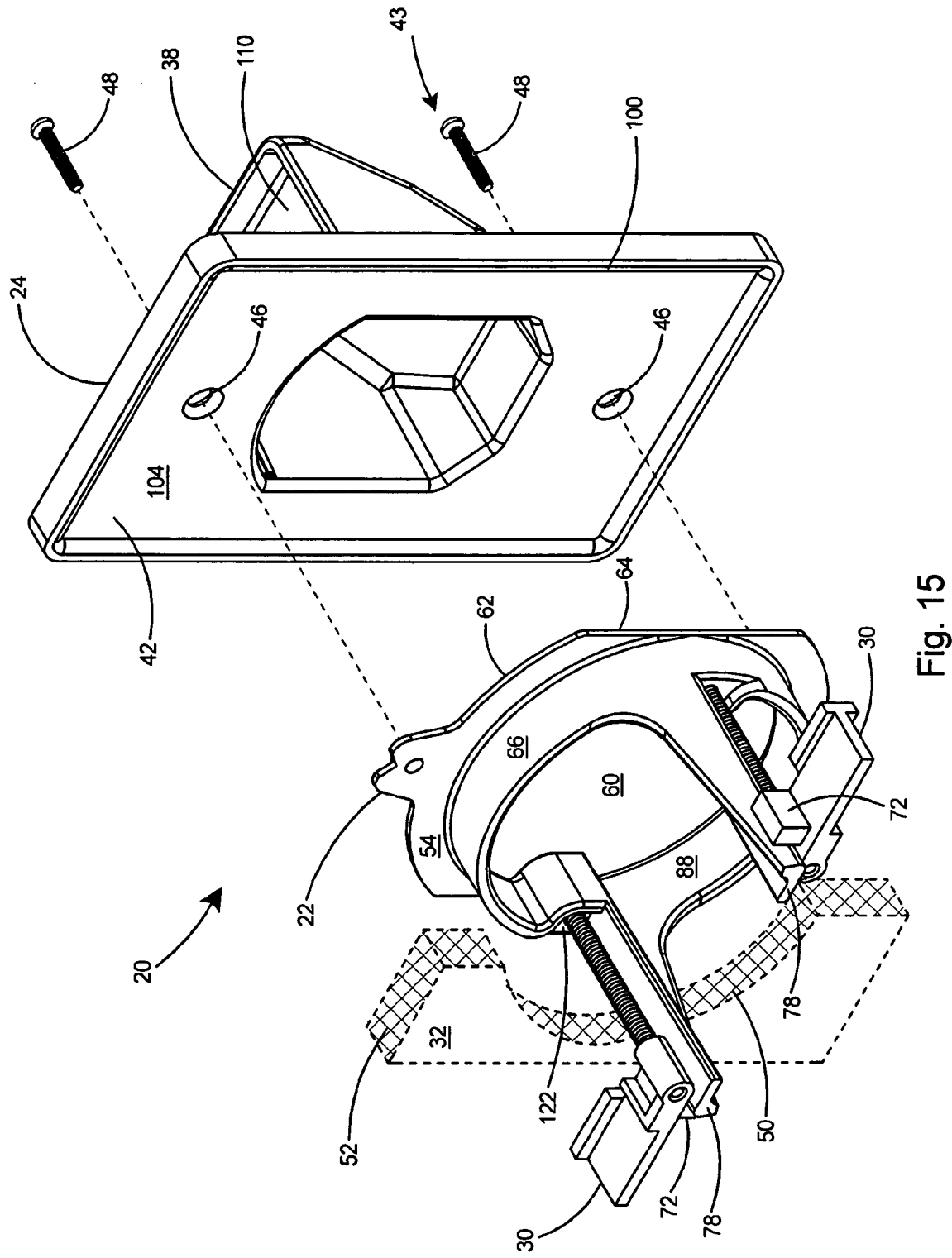
FIG. 15 is a rear perspective view of the cable routing assembly with the cover plate in alignment with the low voltage bracket.

With reference to FIG. 15 there is shown a rear perspective view of the cable routing assembly 20 with the low voltage bracket 22 in alignment with a circular hole 50 in a wall 32 and a cover plate 24 in alignment with the low voltage bracket 22. Only a broken away portion of the wall 32 is shown. Low voltage bracket 22 is first secured to the wall 32 by tightening rotatable flags 30 against the wall. Cover plate 24 can then be oriented in any of four possible orientations, as selected by the homeowner, and secured to the low voltage bracket 22 by fastening arrangement 43 including fasteners 48 through the two-way apertures 46 in the cover plate 24. The cable routing assembly 20 in FIG. 15 is depicted with the cable shield 38 oriented outward of the wall 32 and the cable opening 110 oriented upwards. The collar 66 includes a slot 122 therein adjacent each of the legs 78 and the slots 122 are adapted to receive the rotatable flags 30 therein when the fastening arrangement 43 is in a fully tightened state.

Figure 16:
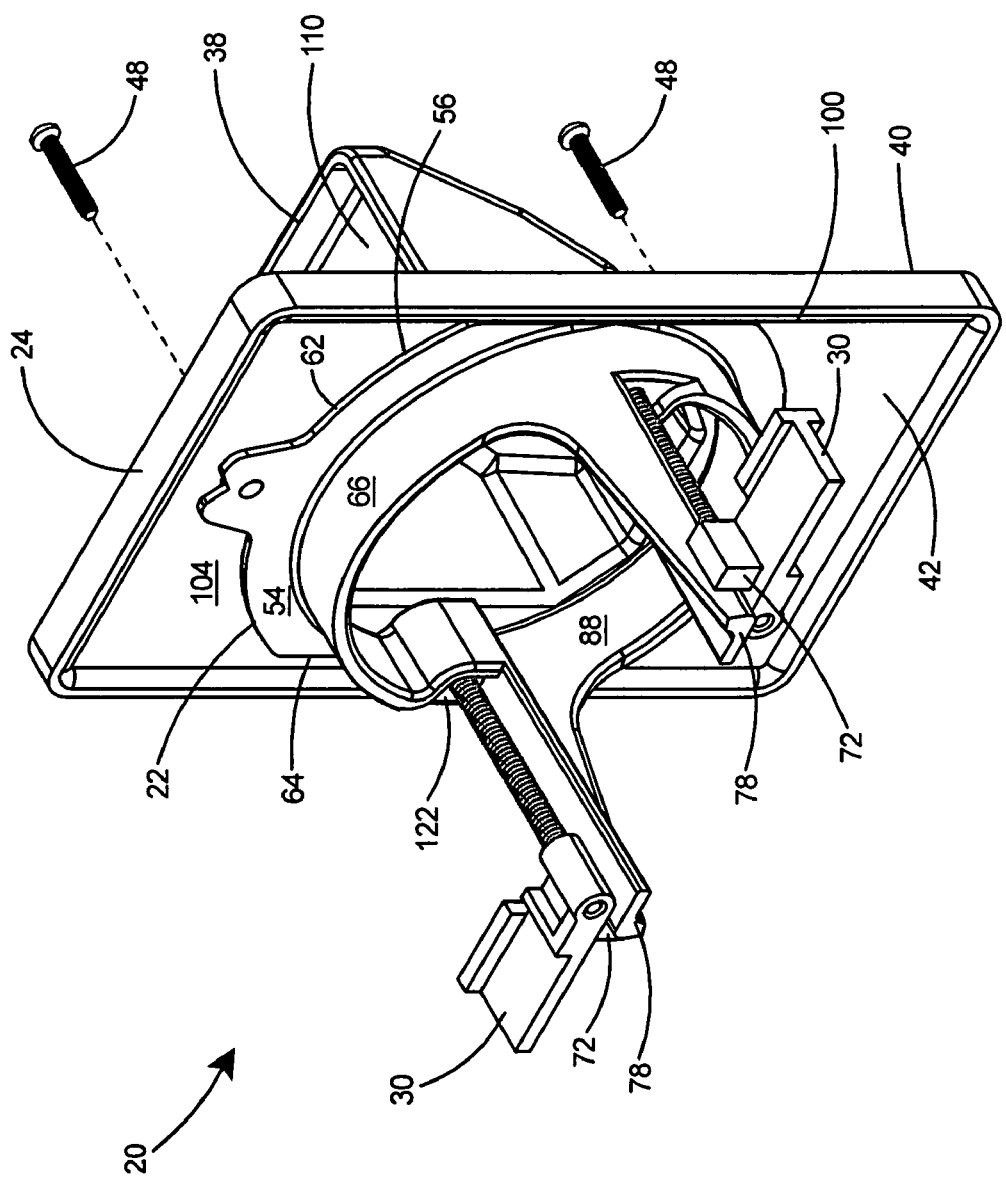
FIG. 16 is a rear perspective view of the cable routing assembly that illustrates the recessing of the low voltage bracket within the interior portion of the cover plate.

FIG. 16 is a rear perspective view of the cable routing assembly 20 that illustrates the recessing of the low voltage bracket 22 within the raised periphery 100 of the cover plate 24. The truncated sides 64 of face flange 54 enable substantially circular shaped face flange 54 to recess within the raised periphery 100 of the cover plate 24. As the raised periphery 100 is provided on both sides 40, 42 of the cover plate 24, the face flange 54 of the low voltage bracket 22 will recess within the recessed area 104 of the cover plate 24 regardless of which side 40, 42 is oriented toward the low voltage bracket 22. The outer periphery 56 of the face flange 54 therefore fits entirely within the raised periphery 100 of the cover plate 24 when the cover plate 24 is secured to the low voltage bracket 22. Thus, by virtue of the two-way apertures 46 (see FIG. 15) and the recessed areas 104 being provided on both sides 40, 42 of the cover plate 24; the cover plate 24 is reversible with respect to the bracket 22.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A cable routing assembly for routing cables through a wall comprising:
    a low voltage bracket including a mounting arrangement for securing said low voltage bracket to said wall;
    said low voltage bracket including a frame member including a face flange having an inner periphery and a collar extending rearward from said inner periphery of said face flange;
    said mounting arrangement including a plurality of mounting fasteners extending through said frame member with each of said mounting fasteners including a distal end and a rotatable flag on said distal end of each of said mounting fasteners;
    said mounting arrangement enabling said rotatable flags to be rotated from a retracted orientation wherein said rotatable flags are rotated inward of said collar to an extended orientation wherein said rotatable flags are rotated outward of said collar;
    a cover plate including a first side and a second side, and an opening therein, said first side including an outward extending cable shield surrounding said opening; and
    a fastening arrangement for fastening said cover plate to said low voltage mounting bracket,
    whereby a circular hole in said wall enables rapid mounting of said cable routing assembly to said wall.

2. The cable routing assembly of claim 1 wherein said face flange of said frame member includes an outer periphery and an opening therein.

3. The cable routing assembly of claim 2 wherein said rotatable flags include tabs thereon; and
    a leg adjacent each of said tabs, said legs extending rearward from said face flange,
    whereby tightening of said mounting fasteners enables each of said tabs to engage a corresponding one of said legs thereby stopping rotation of said rotatable flags and enabling additional tightening of said fasteners to draw each of said rotatable flags toward said frame member.

4. The cable routing assembly of claim 3 wherein said fastening arrangement includes
    a boss in said face flange of said low voltage bracket;
    a pair of two-way apertures in said cover plate; and
    a fastener for securing through said cover plate into said boss in said low voltage bracket.

5. The cable routing assembly of claim 4 wherein
    said two-way apertures are aligned along a vertical axis through said cover plate, said two-way apertures of a spacing and pattern to match said bosses in said frame member; and
    said two-way apertures include countersunk areas in said first side and in said second side of said cover plate.

6. The cable routing assembly of claim 4 wherein
    said outward extending cable shield includes a planar horizontal portion extending from said first side of said cover plate and an outer wall portion; and
    said outward extending cable shield includes a vertical lip extending downward from said outer wall portion.

7. The cable routing assembly of claim 3 wherein
    each of said legs are substantially L-shaped and include a substantially planar main leg portion and a brace portion; and
    said brace portion includes an outer surface.

8. The cable routing assembly of claim 7 wherein
    said collar includes an outer surface; and
    said outer surface of said brace portion of each of said legs is flush with said outer surface of said collar.

9. The cable routing assembly of claim 3 wherein
    said collar includes an inner periphery; and
    said mounting fasteners of said mounting arrangement are inward of said inner periphery of said collar.

10. The cable routing assembly of claim 2 wherein said cover plate includes
    an outer edge and a raised periphery around said outer edge; and
    a recessed area on each of said front surface and said rear surface of said cover plate.

11. The cable routing assembly of claim 10 wherein said recessed area on said first side of said cover plate extends between said outward extending cable shield and said raised periphery, said recessed area on said second side of said cover plate extends between said opening and said raised periphery of said cover plate.

12. The cable routing assembly of claim 10 wherein said recessed area is recessed a depth of at least 0.065 inch from said raised periphery of said cover plate.

13. The cable routing assembly of claim 10 wherein
    said outer periphery of said face flange fits entirely within said raised periphery of said cover plate when said cover plate is secured to said low voltage bracket.

14. The cable routing assembly of claim 13 wherein
    said cover plate is substantially rectangular shaped;
    said face flange of said low voltage bracket includes a depth; and
    said face flange of said low voltage bracket fits entirely within said recessed area of said cover plate when said cover plate is secured to said low voltage bracket.

15. The cable routing assembly of claim 2 wherein
    said collar includes a slot therein adjacent each of said legs; and
    said slots in said collar are adapted to receive said flags therein when said fastening arrangement is in a fully tightened state.

16. The cable routing assembly of claim 1 wherein
said rotatable flags include a proximal end and a distal end; and
said proximal end of said rotatable flags include a bore therein.

17. The cable routing assembly of claim 16 wherein said distal ends of said flags include a flat face thereon.

18. The cable routing assembly of claim 1 wherein said cover plate can be oriented in four separate orientations with respect to said low voltage bracket including
- a first orientation with said cable shield extending outward from said low voltage bracket and said cable opening facing downward;
- a second orientation with said cable shield extending outward from said low voltage bracket and said cable opening facing upward;
- a third orientation with said cable shield extending inward from said low voltage bracket and said cable opening facing downward; and
- a fourth orientation with said cable shield extending inward from said low voltage bracket and said cable opening facing upward.

19. The cable routing assembly of claim 1 wherein said cover plate and said frame member are each molded in one piece of plastic.

20. The cable routing assembly of claim 19 wherein said plastic is selected from the group including polycarbonate, polyvinyl chloride, acrylonitrile-butadiene styrene, and polyethylene.

* * * * *